(12) United States Patent
Chenc

(10) Patent No.: US 8,254,786 B2
(45) Date of Patent: Aug. 28, 2012

(54) METHOD AND SYSTEM FOR MONITORING AND SERVICING DEVICES BASED ON ONE-WIRE INFRARED COMMUNICATION

(75) Inventor: Tomasz Chenc, Siemianowice Slaskie (PL)

(73) Assignee: Diehl AKO Stiftung & Co. KG, Wangen (DE)

( * ) Notice: Subject to any disclaimer, the term of this patent is extended or adjusted under 35 U.S.C. 154(b) by 539 days.

(21) Appl. No.: 12/553,535

(22) Filed: Sep. 3, 2009

(65) Prior Publication Data
US 2010/0054732 A1 Mar. 4, 2010

(30) Foreign Application Priority Data
Sep. 3, 2008 (PL) .......................................... 386019

(51) Int. Cl.
*H04B 10/00* (2006.01)
*H04B 10/12* (2006.01)

(52) U.S. Cl. ........ 398/140; 398/118; 398/128; 398/130; 398/162

(58) Field of Classification Search .................. 398/118, 398/128, 130, 140, 162
See application file for complete search history.

(56) References Cited

U.S. PATENT DOCUMENTS
5,040,168 A * 8/1991 Maue et al. ...................... 398/43
2003/0053172 A1 * 3/2003 Jung .............................. 359/152
2004/0036808 A1 * 2/2004 Lendaro ......................... 348/725
2004/0041712 A1 3/2004 Collovini et al.
2007/0147844 A1 * 6/2007 Harres ........................... 398/135
2008/0235418 A1 * 9/2008 Werthen et al. ................ 710/106
2009/0116847 A1 * 5/2009 Duan et al. ..................... 398/137
2009/0196604 A1 * 8/2009 Grann et al. ..................... 398/41
2010/0165189 A1 * 7/2010 Bae et al. ....................... 348/441

FOREIGN PATENT DOCUMENTS
| CA | 2032861 | 6/1992 |
| CN | 1652414 | 8/2005 |
| EP | 0 491 095 B1 | 6/1992 |

* cited by examiner

*Primary Examiner* — Kenneth N Vanderpuye
*Assistant Examiner* — Daniel Dobson
(74) *Attorney, Agent, or Firm* — Laurence A. Greenberg; Werner H. Stemer; Ralph E. Locher

(57) ABSTRACT

A digital signal is sent by a one-wire digital input/output unit of a one-wire IR communication system at the side of the dedicated device to an IR transmitting element, a working range is established in which the IR signal is sent, which is received at the side of the target device by an IR receiving element of the one-wire IR communication system of the target device, and the IR signal is sent by the one-wire digital input/out of the IR system across the main communication trunk to the modules of the target device. The system has a one-wire infrared communication system installed in a dedicated device and a target device, containing a one-wire digital input/output of the system, connected to a separator/amplifier unit with RxD and TxD lines, while the one-wire input/output of the system at the side with the dedicated device is connected to units of the testing system of the device and at the side with the target device the one-wire digital input/output of the system is connected directly by the main communication trunk to the modules of the target device.

11 Claims, 2 Drawing Sheets

METHOD AND SYSTEM FOR MONITORING AND SERVICING DEVICES BASED ON ONE-WIRE INFRARED COMMUNICATION

CROSS-REFERENCE TO RELATED APPLICATION

This application claims the priority, under 35 U.S.C. §119, of Polish patent application P-386019, filed Sep. 3, 2008; the prior application is herewith incorporated by reference in its entirety.

BACKGROUND OF THE INVENTION

Field of the Invention

The invention pertains to a method and a system for the monitoring and servicing of devices based on one-wire infrared communication, especially on the production line.

Various methods are known for monitoring and servicing devices, often known as device testing and control methods. The most widespread and frequently used methods employ cable communication, wherein the tested device (target device) is hooked up to a testing device (dedicated device) by means of a cable, it being most common to use an interface for nontypical connections in this application.

Infrared systems are also known, although the presently available systems are not compatible with a one-wire communication mode. Most often, we have to do with a mode of separated RxD/TxD lines. Furthermore, infrared systems enable communication only with the main module in a given device, tying up quite a lot of processor resources and additionally implemented programming for its servicing. In the event of damaging or malfunction of the main module, a complete diagnosis of each individual module is necessary.

The prior art infrared-based systems are very sensitive to light and contamination; in fact, the distance between the dedicated device, e.g., a "testing head" on a production line, and the target device is between several millimeters and 2-3 centimeters with total isolation of the infrared system from external factors such as sunlight, artificial light, etc.

SUMMARY OF THE INVENTION

It is accordingly an object of the invention to provide a method and a system for monitoring and servicing devices based on one-wire infrared communication which overcome the disadvantages of the heretofore-known devices and methods of this general type.

With the foregoing and other objects in view there is provided, in accordance with the invention, a method for monitoring and servicing devices based on one-wire infrared communication, wherein a digital signal is sent between a dedicated device and a target device, and the method comprises:

sending a digital signal by a transmitting/receiving line of a one-wire digital input/output of a one-wire IR communication system at the dedicated device to a separator/amplifier system and then sending the signal by way of a TxD line to a signal shaping unit and introducing a time delay and, at the same time, subjecting a feedback unit for the transmitted signal to stimulation by the transmitted signal and blocking a receiving signal, while the transmitted signal is sent on to an IR transmitting element;

wherein by way of the IR transmitting/receiving units of the one-wire IR communication system at the side with the dedicated device and the IR transmitting/receiving unit of the one-wire IR communication system at the side with the target device a working range is established in which the IR signal is sent, being received at the side with the target device by the IR receiving element of the one-wire IR communication system of the target device, and sending the signal to an amplifier unit for the received signal, where the received signal is subject to amplification and sent by the RxD line to the separator/amplifier unit, where the signal is transmitted to the one-wire digital input/output of the IR system;

sending the signal from the one-wire digital input/output of the IR system by a main communication trunk to respective modules of the target device, wherein a separator/amplifier unit separates the one-wire IR communication system from the rest of the system of the target device and the separator/amplifier unit separates the transmitting signal and the receiving signal, such that by virtue of the input/output of the one-wire IR communication the reception of RxD data is separated from the transmission of TxD data, and by virtue of the IR system the reception of RxD data and transmission of TxD data are connected to the one-wire digital input/output of the IR system, while at the same time in the IR system the feedback unit for the received signal is subjected to stimulation by the received signal and the transmitted signal is blocked, which is sent by the TxD line at the instant when the signal from the separator/amplifier unit is received from the transmitting/receiving line of the one-wire digital input/output of the IR system, and furthermore a delay time is established in the feedback unit between the end of the received data and the releasing of the transmitting/receiving line of the one-wire digital input/output of the IR system.

In other words, the method of the invention is characterized in that a digital signal is sent by the transmitting/receiving line of the one-wire digital input/output of a one-wire IR communication system at the side of the dedicated device to a separator/amplifier system and then the signal is sent by the TxD line to a signal shaping unit, where a time delay is introduced, at the same time a feedback unit for the transmitted signal is subjected to stimulation by the transmitted signal and the receiving signal is blocked, while the transmitted signal is sent on to an IR transmitting element, wherein by means of the IR transmitting/receiving units of the one-wire IR communication system at the side with the dedicated device and the IR transmitting/receiving unit of the one-wire IR communication system at the side with the target device a working range is established in which the IR signal is sent, being received at the side with the target device by the IR receiving element of the one-wire IR communication system of the target device, and it is sent to an amplifier unit for the received signal, where the received signal is subject to amplification and sent by the RxD line to the separator/amplifier unit, where the signal is transmitted to the one-wire digital input/output of the IR system, from which the signal is sent by the main communication trunk to the modules of the target device, wherein the separator/amplifier unit separates the one-wire IR communication system from the rest of the system of the target device and the separator/amplifier unit separates the transmitting signal and the receiving signal, such that by virtue of the input/output of the one-wire IR communication the reception of RxD data is separated from the transmission of TxD data, and by virtue of the IR system the reception of RxD data and transmission of TxD data are connected to the one-wire digital input/output of the IR system, while at the same time in the IR system the feedback unit for the received signal is subjected to stimulation by the received signal and the transmitted signal is blocked, which is sent by the TxD line at the instant when the signal from the separator/amplifier unit is received from the transmitting/receiving line of the one-wire digital input/output of the IR system, and furthermore a delay time is established in the feedback unit between the end of the received data and the releasing of the transmitting/receiving line of the one-wire digital input/output of the IR system.

Advantageously, in the one-wire IR communication system, the signal is sent to the signal shaping unit by the TxD line of the separator/amplifier unit across a decoder/encoder unit.

Advantageously, in the one-wire IR communication system, the signal is sent to the RxD line of the separator/amplifier unit by the received signal amplifier unit across a decoder/encoder unit, by means of which the conversion from one transmission system to another is accomplished.

Advantageously, in the one-wire IR communication system, a special TTL condition is sent to the RESET control input and a control signal is sent to control the decoder/encoder unit in the target device and the dedicated device.

Advantageously, in the one-wire IR communication system, a special TTL condition is sent to the ON/OFF control input and a control signal is sent to control the input/output lines of the one-wire IR communication system of the target device and the dedicated device via the ON/OFF unit.

With the above and other objects in view there is also provided, in accordance with the invention, a system for monitoring and servicing devices based on one-wire infrared communication, containing a dedicated device and a target device, the system comprising:

a one-wire infrared communication system installed in the dedicated device and the target device, the communication system including a digital one-wire input/output connected to a separator/amplifier unit with RxD and TxD lines, wherein the one-wire input/output of the system at the dedicated device is connected to units of a testing system of the dedicated device and at the target device the digital one-wire input/output of the system is connected directly across a main communication trunk to modules of the target device;

both the one-wire infrared communication units including a feedback unit for a received signal, connected to the system, and a signal shaping unit connected across a TxD line and connected to an IR transmitting element;

a feedback unit for the transmitted signal connected between the signal shaping unit and the IR transmitting element, and an amplifier unit for the received signal connected across the RxD line and connected to an IR receiving element;

the one-wire IR communication system including at least one IR transmitting/receiving element at the dedicated device and situated relative to the IR transmitting/receiving element of the one-wire IR communication unit located at the target device to form a working range for the IR transmitting/receiving elements of the one-wire infrared communication units.

In other words, the system according to the invention is characterized in that a one-wire infrared communication system is installed in the dedicated device and the target device, comprising a digital one-wire input/output of the system, which is connected to a separator/amplifier unit with RxD and TxD lines, wherein the one-wire input/output of the system at the side with the dedicated device is connected to the units of a device testing system and at the side with the target device the digital one-wire input/output of the system is connected directly across the main communication trunk to the modules of the target device, in addition both one-wire infrared communication units contain a feedback unit for the received signal, connected to the unit, while a signal shaping unit is connected across the TxD line and it is connected to an IR transmitting element, while between the signal shaping unit and the IR transmitting element is hooked up a feedback unit for the transmitted signal, and an amplifier unit for the received signal is hooked up across the RxD line and it is connected to an IR receiving element, while at the side with the dedicated device the one-wire IR communication system contains at least one IR transmitting/receiving element, which is situated relative to the IR transmitting/receiving element of the one-wire IR communication unit located at the side with the target device (30) to form a working range for the IR transmitting/receiving elements of the one-wire infrared communication units.

Advantageously, the IR transmitting/receiving element of the one-wire IR communication system is a diode.

Advantageously, in the one-wire IR communication system, the decoder/encoder unit is installed between the feedback unit for the received signal and the signal shaping unit, the signal amplifier unit, and the feedback unit for the transmitted signal.

Advantageously, in the one-wire IR communication system, the RESET control input for control of the unit is hooked up to the decoder/encoder unit.

Advantageously, the one-wire IR communication system contains a control signal input for controlling the ON/OFF unit, hooked up to the input/output of the decoder/encoder unit.

One benefit of the invention is that it ensures full one-wire communication in regard to the currently employed two separate RxD and TxD signals. As a result, it ensures direct communication between the systems of the dedicated testing device and the modules of the tested target device and the one-wire IR communication system built into the dedicated and target device.

Another benefit of the invention is the providing of greater distance on the order of 20-30 cm in the one-wire infrared communication between the dedicated device and the target device, while the one-wire IR communication system with "optional" decoder/encoder unit provides an even greater distance. Furthermore, in the case of the optional use of the decoder/encoder unit in the one-wire IR communication system, a lower power consumption is needed to establish and maintain the communication.

Yet another benefit of the invention is that it provides total independence of the one-wire IR communication system built into the dedicated and target device, owing to absence of any programming changes in existing designs. Furthermore, the invention provides a great reliability, as well as great resistance to interference, such as smoke, light, including sunlight and light emitted by bulbs, tubes, etc, which is especially important in the process of production and testing of target devices by dedicated devices.

The invention thanks to the one-wire IR communication system built into the dedicated and target device also ensures a continuity of work, making it possible to carry out a monitoring (testing and inspection) and servicing of target devices.

Some of the target devices tested, such as kitchen ranges, use protective filtering glass of irregular surface, often of various colors, constituting a major problem during IR communication, since the beam of signals transmitted between devices does not reach the intended location. Most often, it is attenuated by the glass or reflected by the irregular surface. The invention provides great tolerance to the location of the working range, or the range received by the dedicated device in a particular range relative to the target device in which the IR signal beam is sent between devices.

Another benefit of the invention is that it speeds up the production process at the production line and performs the final diagnostics of the product on finished, sealed product ready for shipping. This also ensures very easy diagnostics and the possibility of reprogramming a device without opening it or hooking up a cable. The solution of the invention, thus, does not require any mutual mechanical interaction with the product. It enables very rapid access and safety of diagnostics, eliminating mistakes due to handling and testing of each module apart from the target device.

Another benefit of the invention is the ease of adding the one-wire IR communication system to all existing products. The only limitations pertain to the rising/falling slopes, where it may be required to tune the system (selection of appropriate time intervals).

Other features which are considered as characteristic for the invention are set forth in the appended claims.

Although the invention is illustrated and described herein as embodied in a method and system for monitoring and servicing of devices based on one-wire infrared communication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The invention is implemented on the basis of one-wire communication between the tested target device and the dedicated testing device, being at the same time a superior monitoring and overseeing device, such as a production process.

Figure 1:
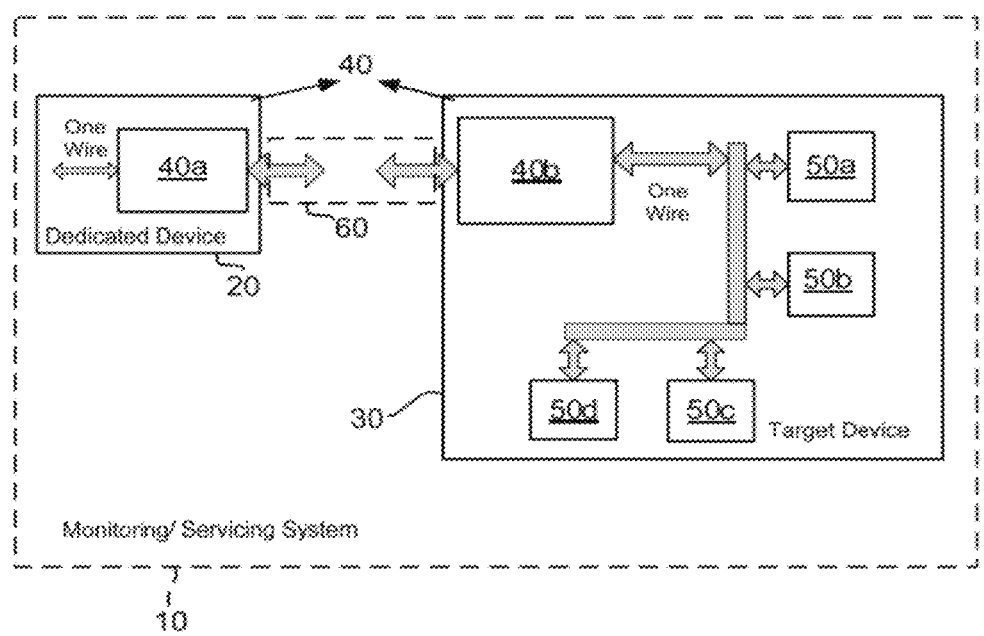
FIG. 1 is a block diagram illustrating an exemplary embodiment of the system according to the invention for monitoring and servicing of devices.

Referring now to the figures of the drawing in detail and first, particularly, to FIG. 1 thereof, there is shown an implementation of a system 10 for monitoring and servicing of devices, in which a dedicated device 20 and a target device 30 are outfitted with a one-wire IR communication system, respectively, 40a and 40b, wherein the units 40a and 40b are identical. Both units 40a and 40b communicate via the one-wire digital input/output directly with the individual modules and systems located in the devices in which the one-wire IR communication system 40 is installed, respectively 40a and 40b. Thus, the one-wire digital input/output at the side of the dedicated device 20 is connected to the units of the testing system (not shown in FIG. 1), and the one-wire digital input/output at the side of the target device 30 is connected directly by the main communication trunk to the modules 50, i.e., the modules 50a, 50b, 50c, 50d, thereby enabling a direct checking and testing of the modules 50 of the device in terms of their correct working, a so-called checking of which module 50 of the target device 30 is faulty. For example, the target device 30 in which the one-wire IR communication system 40 is incorporated can be one of the products of the household sector, such as a cooking range, washing machine, refrigerator, dishwasher, etc. If it occurs in a washing machine, e.g., then the one-wire communication system 40b built into it is connected directly by the aforesaid main trunk to the modules 50 of the washing machine, such as the user interface module, the motor and pump control module, etc.

The devices 20 and 30, along with the units 40a and 40b built into them, realize a wireless infrared communication, while the communication link between the devices occurs in identical manner, regardless of whether this is a cable or wireless link. This involves, first and foremost, avoidance of the need to modify already existing products (except for adding the actual wireless communication system).

The method of carrying out the monitoring and servicing of devices occurs as follows: the dedicated device 20, such as a service head with built-in one-wire IR communication system 40, is located at appropriate distance from the target device 30, e.g., a washing machine with built-in one-wire IR communication system 40, so as to ensure a communication, without this hampering the normal flow of products at the production line. The one-wire IR communication system 40a and 40b built into the device is a kind of extension of its main communication trunk, enabling a wireless communication with the "outside world," which makes possible modifications for communication not only with the dedicated device, but also with devices available on the market, such as telephones, PDAs, and wireless devices for data collection, etc.

Figure 2:
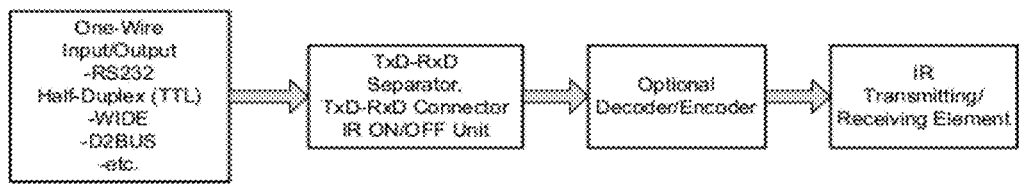
FIG. 2 is a block diagram of the proposed one-wire IR communication system built into the tested target device and the dedicated testing device.

FIG. 2 shows a general block diagram of the proposed one-wire IR communication system, which will be described in greater detail hereafter in FIG. 3. The one-wire IR communication system shown in FIG. 2 can be expanded with an analog signal input-frequency modulating unit and a much larger number of transmitting-receiving elements in order to increase the distance between the dedicated testing device and the tested target device. Furthermore, it is possible to add a transmission protocol for a link to various kinds of devices, such as IrDA, in which case the transmitted signal must basically correspond to the RS232 standard. Modifications are also possible for communication not only with the dedicated device, but also with devices available on the market, such as telephones, PDAs, and wireless devices for data collection, etc.

Figure 3:
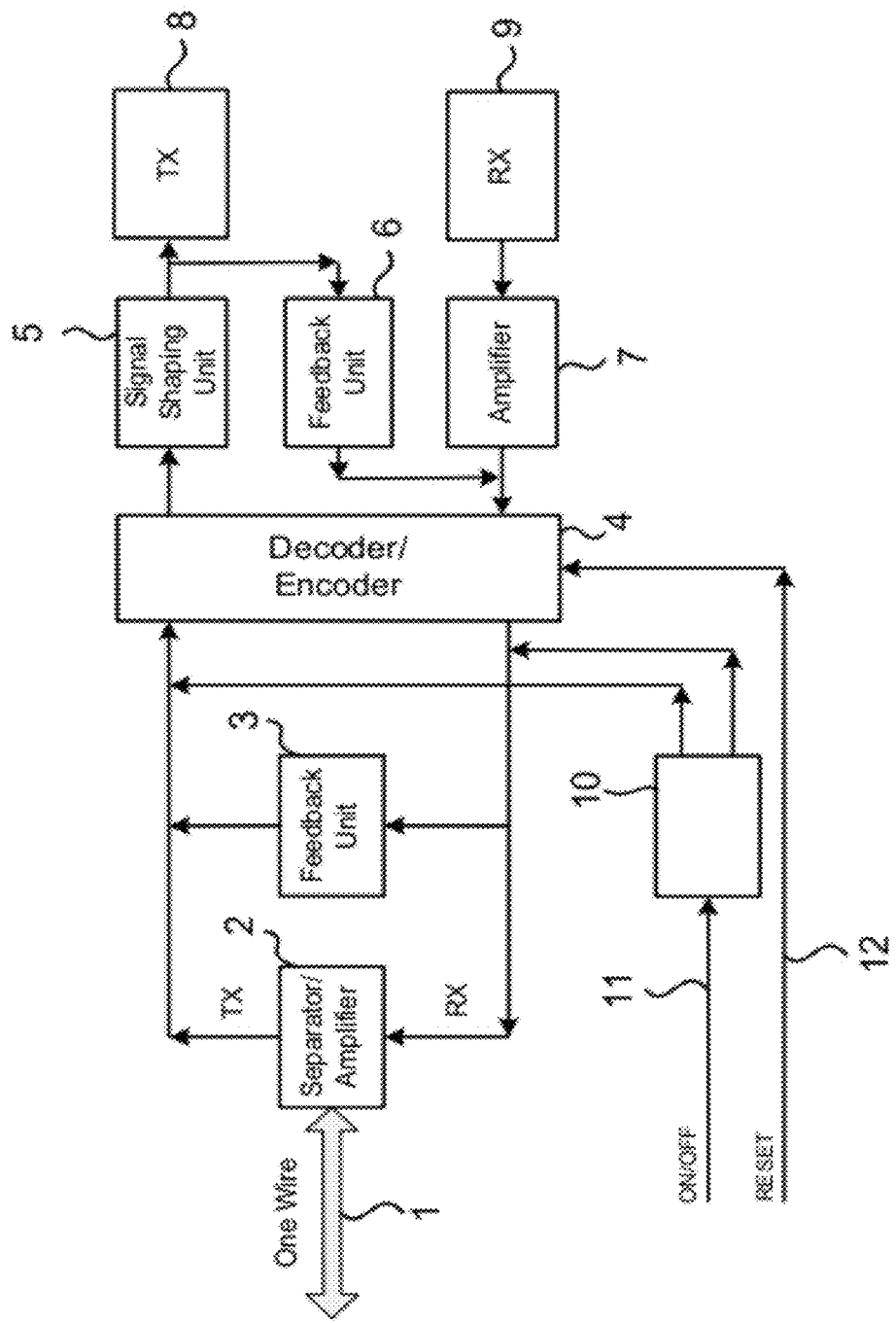
FIG. 3 a detailed block diagram of the one-wire IR communication system built into the device.

FIG. 3 shows a detailed block diagram of the one-wire IR communication system built into the dedicated and target device, where one can distinguish the one-wire digital input/output 1 of the IR system, by which the transmitting/receiving signal is sent, as well as two optional inputs: the input of the ON/OFF control signal 11 for control of the optional ON/OFF unit 10 and the RESET control input 12 for control of the optional decoder/encoder unit 4. By the control signal input 11 of the ON/OFF unit 10, the IR system is controlled. By applying a special TTL condition to the input of the system 10, part of the IR system is shut off and goes into a sleep mode. At that time, no signal from the one-wire line is transmitted to the "outside world", and no signal from the "outside world" is transmitted to the one-wire line. The optional ON/OFF unit 10 lets one control when the one-wire IR communication system will work and when it will not. This is especially helpful when we want to call up the service system of the dedicated device only in a certain period of time, e.g., 30 seconds after turning on the power, after which the unit is to go into a ready to use mode. This is very important, since the modules in the device communicate precisely by means of this interface.

Moreover, the one-wire IR communication system contains the following functional blocks: a separator/amplifier unit 2, responsible for separating the IR system from the rest of the overall system of the dedicated device and the target device, so that the switched-on one-wire IR communication system in the devices has the lowest influence on the surrounding to which it is hooked up. The separator/amplifier unit 2 also has as its task the separating of the transmitted signal and the received signal. In terms of one wire, this means separating RxD and TxD; in terms of IR, this means connection to the one wire. The unit also plays the part of noise suppression and matching of the input signal. Signal matching involves identifying the appropriate working range from the entire possible range of the individual modules. In this case, the signal is a TTL signal 0-5 V. The logical one and zero state according to the standard has corresponding parameters. Most of the cheaper units are built in terms of cost optimization and great tolerance. In effect, this means that a signal which is sent further might be distorted so much that proper communication would be impossible. This is all the more important in that the signal source for the one wire is a microprocessor transmitting in the RS232 system, which is then transformed into the one-wire system by means of transistor switches and stages. These stages, their switching time, the capacity of the line and the different loading for the low and high state make the signal on the one-wire line more similar to an analogue one (characteristic of a charged/discharged capacitor), e.g., on the falling and rising slope. It seems more or less as though the rise time of the slope is several times longer than the falling time of the slope. This causes a distortion of the signal sent, for then the logical one state is longer than the duration of logical zero. The one-wire IR communication system through the separator/amplifier unit 2 causes the proportion of one to zero to be preserved regardless of whether the slope is rising or falling.

The next functional block which can be identified in the IR system is the feedback unit 3 for the received signal. This unit is responsible for blocking the transmitted signal at the time when transmission of data from the "outside world" is received. This prevents the mirror effect, when the signal received is simultaneously transmitted with a delay depending on the number of stages between the receiver block and the one-wire line. This block as a set delay time between the end of the data reception and the releasing of the transmission line; this prevents undetermined states and compensates for the influence of independent factors, such as the intensity of light in the vicinity of the receiver, contamination of the surface between the service transmitter and the system (glass, Plexiglas), delay at the individual stages of the system, etc.

Furthermore, one can identify in the IR system an optional decoder/encoder unit 4, which is responsible for conversion from one transmission system to another. In the basic version, the signal transmitted and received by elements 8 and 9 is identical in form to the flowing signal which is the source. By using this unit, it is possible to expand the functionality with an IrDA decoder/encoder, for example. One benefit from this use is the possibility of communicating not only with the dedicated (service) device, but also with the already widely available devices servicing this standard, such as a telephone, PDA, etc.

The next functional block is the signal shaping unit 5, which is responsible for inverting, separating, and suppressing the noise for the signal from feedback unit 3 and decoder/encoder unit 4. Furthermore, unit 5 introduces a slight time delay, improving the working stability of the overall system.

One also identifies the feedback unit 6 for the transmitted signal, which performs identical tasks to the feedback unit 3 for the received signal, but here it is the received signal which is blocked.

Moreover, the one-wire IR communication system contains an amplifier unit 7 for the received signal, whose task is to amplify the received signal and a number of functions enabling more stable operation of the system, including providing of sleep mode, cut-off of constant components (important with large interference by sunlight/artificial lighting), quick return to work for the "sleeping" receiving unit, initiated by the transmitting unit itself or a nearby source of another interfering signal).

The last functional blocks which can be identified in the proposed IR system are the IR transmitting element 8 for transmitting a signal from the IR system built into the dedicated device or target device and the IR receiving element 9 for receiving a signal from the IR system built into the dedicated device or target device.

The invention finds application in a broad field of products compatible with all existing communication standards, such as Whirlpool-WIDE, BSH-D2BUS and all other half-duplex communication standards. Furthermore, the proposed one-wire IR communication system built into the target device can work in a broad temperature range (85° C., possibly 105° C.).

The invention can be used for monitoring and testing of all devices, especially household appliances, such as kitchen ranges, washing machines, refrigerators, dishwashers, etc., on the production line of an automated production process. Furthermore, the invention can also be used in the process of servicing of a product directly at the customer's location during the term of use of the appliance.

The invention claimed is:

1. A method for monitoring and servicing devices based on one-wire infrared communication, wherein a digital signal is sent between a dedicated device and a target device, and the method comprises:

sending a digital signal by a transmitting/receiving line of a one-wire digital input/output of a one-wire IR communication system at the dedicated device to a separator/amplifier system and then sending the signal by way of a TxD line to a signal shaping unit and introducing a time delay and, at the same time, subjecting a feedback unit for the transmitted signal to stimulation by the transmitted signal and blocking a receiving signal, while the transmitted signal is sent on to an IR transmitting element;

wherein by way of the IR transmitting/receiving units of the one-wire IR communication system at the side with the dedicated device and the IR transmitting/receiving unit of the one-wire IR communication system at the side with the target device a working range is established in which the IR signal is sent, being received at the side with the target device by the IR receiving element of the one-wire IR communication system of the target device, and sending the signal to an amplifier unit for the received signal, where the received signal is subject to amplification and sent by the RxD line to the separator/amplifier unit, where the signal is transmitted to the one-wire digital input/output of the IR system;

sending the signal from the one-wire digital input/output of the IR system by a main communication trunk to respective modules of the target device, wherein a separator/amplifier unit separates the one-wire IR communication system from the rest of the system of the target device and the separator/amplifier unit separates the transmitting signal and the receiving signal, such that by virtue of the input/output of the one-wire IR communication the reception of RxD data is separated from the transmission of TxD data, and by virtue of the IR system the reception of RxD data and transmission of TxD data are connected to the one-wire digital input/output of the IR system, while at the same time in the IR system the feedback unit for the received signal is subjected to stimulation by the received signal and the transmitted signal is blocked, which is sent by the TxD line at the instant when the signal from the separator/amplifier unit is received from the transmitting/receiving line of the one-wire digital input/output of the IR system, and furthermore a delay time is established in the feedback unit between the end of the received data and the releasing of the transmitting/receiving line of the one-wire digital input/output of the IR system.

2. The method according to claim 1, which comprises sending the signal in the one-wire IR communication system to the signal shaping unit by the TxD line of the separator/amplifier unit across a decoder/encoder unit.

3. The method according to claim 2, which comprises, in the one-wire IR communication system, sending a special TTL condition to a RESET control input and sending a control signal to control the decoder/encoder unit in the target device and the dedicated device.

4. The method according to claim 1, which comprises sending the signal in the one-wire IR communication system to an RxD line of the separator/amplifier unit by way of the received signal amplifier unit across a decoder/encoder unit, and thereby accomplishing a conversion from one transmission system to another.

5. The method according to claim 4, which comprises, in the one-wire IR communication system, sending a special TTL condition to a RESET control input and sending a control signal to control the decoder/encoder unit in the target device and the dedicated device.

6. The method according to claim 1, which comprises, in the one-wire IR communication system, sending a special TTL condition to an ON/OFF control input and sending a control signal to control the input/output lines of the one-wire IR communication system of the target device and the dedicated device via the ON/OFF unit.

7. A system for monitoring and servicing devices based on one-wire infrared communication, containing a dedicated device and a target device, the system comprising:

a one-wire infrared communication system installed in the dedicated device and the target device, said communication system including a digital one-wire input/output connected to a separator/amplifier unit with RxD and TxD lines, wherein said one-wire input/output of the system at the dedicated device is connected to units of a testing system of the dedicated device and at the target device said digital one-wire input/output of the system is connected directly across a main communication trunk to modules of the target device;

both said one-wire infrared communication units including a feedback unit for a received signal, connected to the system, and a signal shaping unit connected across a TxD line and connected to an IR transmitting element;

a feedback unit for the transmitted signal connected between said signal shaping unit and said IR transmitting element, and an amplifier unit for the received signal connected across the RxD line and connected to an IR receiving element;

said one-wire IR communication system including at least one IR transmitting/receiving element at the dedicated device and situated relative to said IR transmitting/receiving element of the one-wire IR communication unit located at the target device to form a working range for the IR transmitting/receiving elements of the one-wire infrared communication units.

8. The system according to claim 7, wherein said IR transmitting/receiving element of the one-wire IR communication system is a diode.

9. The system according to claim 7, wherein said one-wire IR communication system includes a decoder/encoder unit installed between said feedback unit for the units.

10. The system according to claim 9, which comprises a RESET control input for control of the unit connected to said decoder/encoder unit.

11. The system according to claim 9, wherein said one-wire IR communication system includes a control signal input for controlling an ON/OFF unit connected to an input/output of said decoder/encoder unit.

\* \* \* \* \*